No. 12,103.
REISSUED MAR. 24, 1903.
C. G. BURKE.
TELEPHONIC APPARATUS.
APPLICATION FILED FEB. 28, 1903.
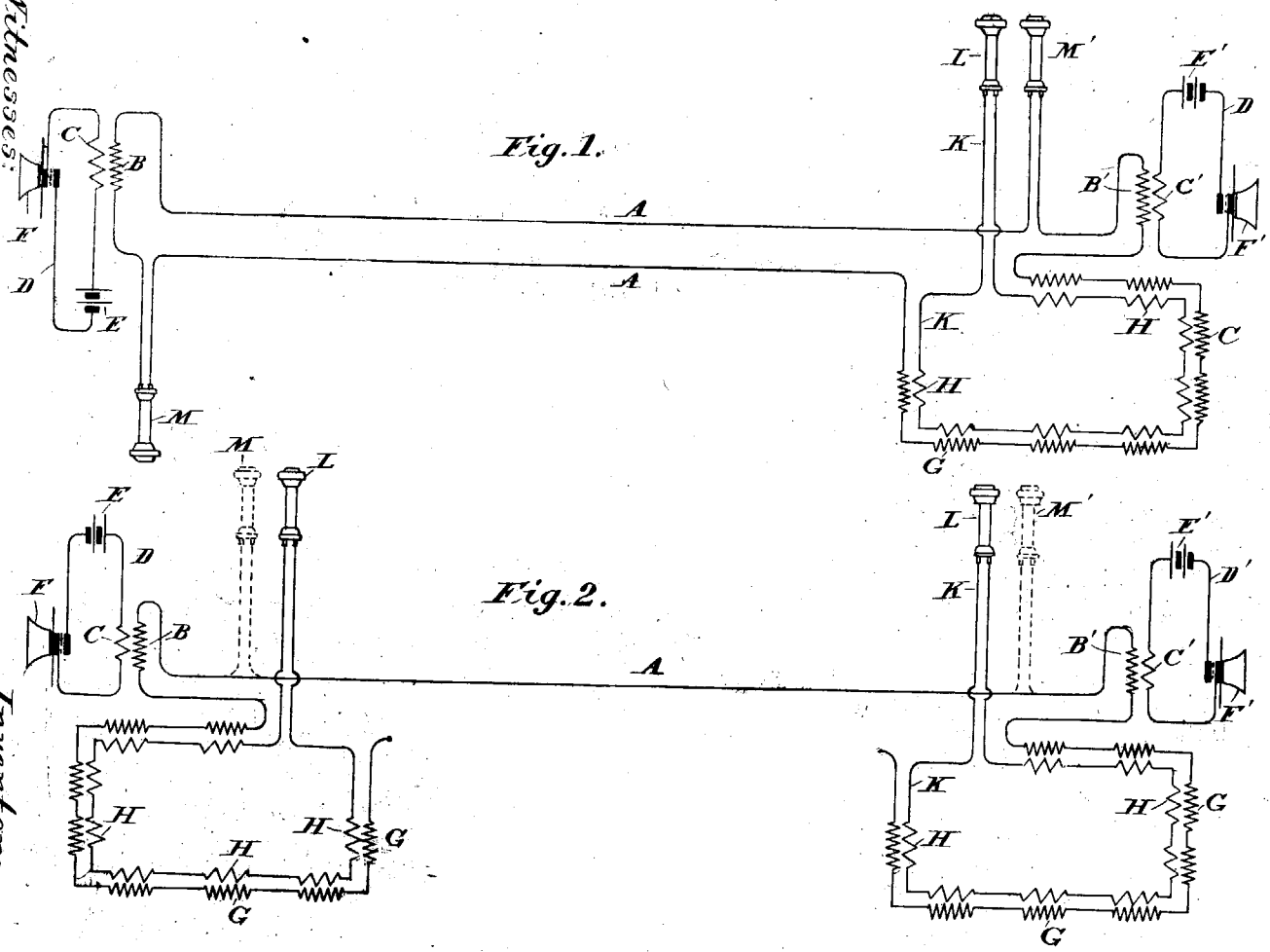
Witnesses:
John O. Gempler
Timothy E. Raftery
Inventor:
Chas. G. Burke
by
F. F. Compton
Atty

UNITED STATES' PATENT OFFICE.

CHARLES G. BURKE, OF BROOKLYN, NEW YORK, ASSIGNOR OF ONE-HALF TO JOHN Q. A. WHITTEMORE, OF BOSTON, MASSACHUSETTS.

TELEPHONIC APPARATUS.

SPECIFICATION forming part of Reissued Letters Patent No. 12,103, dated March 24, 1903.

Original No. 719,432, dated February 3, 1903. Application for reissue filed February 28, 1903. Serial No. 145,606.

*To all whom it may concern:*

Be it known that I, CHARLES G. BURKE, a citizen of the United States, residing in the borough of Brooklyn, in the county of Kings and State of New York, have invented certain new and useful Improvements in Telephonic Apparatus, of which the following is a specification, reference being had to the drawings accompanying and forming a part of the same.

The invention which forms the subject of my present application is an improved telephonic apparatus based upon the results of certain discoveries made by myself in attempts to obtain a receiving instrument for telephone-lines capable of reproducing more distinctly and audibly the words spoken into the transmitter.

Primarily the invention consists in a novel receiving apparatus; but it also includes the combination of such apparatus with a line-circuit composed of a single conductor which is not grounded at either end, I having discovered that under these conditions I am enabled to transmit with perfect distinctness articulate speech.

Stated briefly, and in general terms, the receiving apparatus comprises two magneto or Bell receivers arranged usually in a convenient manner, so that in use one instrument may be held to each ear. One receiver is in the line-circuit or connected with the single conductor of the same, while the other is in a local circuit maintained in inductive relation to the line by means of a plurality of induction-coils, the long fine-wire coils of which are in the line and the short coarse-wire coils of which are in the local. With such a receiving apparatus, and particularly when the telephones and induction-coils are arranged in the specific manner hereinafter set forth, I have found that results of a novel and remarkable character may be obtained, for not only is the speech transmitted louder and more distinct than by means of any other apparatus of which I am aware, but it is also possible to transmit over an open circuit—that is to say, a single conductor—which is not grounded at either end.

I shall describe the details of my improvement by reference to the accompanying drawings, in which—

Figure 1 is a diagram of an ordinary metallic-circuit system or line to which the receiving apparatus is applied, and Fig. 2 a similar diagram illustrating the arrangement which may be adapted for transmitting over a single ungrounded wire.

For the sake of simplifying the illustration I have shown my improved receiving apparatus as applied to one end of the circuit only; but it will be understood that it may be used at both ends in lieu of the ordinary receiver.

Referring to Fig. 1, A designates an ordinary two-wire or metallic telephone-line circuit. At each end of this circuit there is the usual long fine-wire secondary coils B B′ of an induction-coil for transforming currents of low potential in the local circuits to currents of high potential in the line. The short-wire primaries C C′ of the induction-coils are included in the local circuits D D′, respectively, in which latter are also the batteries E E′ and carbon or other transmitters F F′ for producing pulsating currents in the local circuits to correspond with the sound-waves affecting the transmitters. The line-circuit includes in addition to the usual fine-wire coils B B′ a plurality of coils G, which form a part of the receiving apparatus. These coils are of long fine wire, similar to the secondaries B B′, and may vary in number. By way of illustration I have shown eight; but a less or a greater number may be employed, and generally I have found that the larger the number the better the results secured. I have used, for example, in experimental tests twenty or more of such coils with apparently improved results with every additional coil. These coils constitute the primaries of induction-coils, each having its appropriate secondary H of shorter and coarser wire, all of such secondaries being connected with a local circuit K, including a magneto-telephone receiver L. These coils retransform the high-potential currents of the main line to low potential and high-amperage currents in the local circuit. The high-amperage currents thus produced greatly increase the efficiency of the magnet on the diaphragm of the telephone-receiver. The secondaries H may be all in series with each other, although it is not necessary to adhere to this arrangement, while the same is true of the primaries C, the special arrangement in either case depending upon the character of the results desired. I have found, moreover, that better results are obtained by using induction-coils in which the relative lengths and resistances of the primary and secondary circuits are different, so that the currents induced by a given primary current will have different potentials.

The second of the two telephones which make up the receiver is an ordinary Bell or magneto instrument M′, connected directly in the line in the same manner as is usually done and, as shown, by the receiver M at the left. When the system is thus arranged and the transmitter F operated by the voice, a difference in the loudness and clearness of reproduction of the speech by the two instruments L and M′ will be detected by holding first one and then the other to the ear; but if both instruments be held one to each ear a remarkably-pronounced effect will be at once apparent, for not only is the speech much louder than when a single instrument is used or when two instruments, both in the line-circuit, are held to the ears at the same time, but the articulation is much more distinct. I do not advance any theory in explanation of this fact, deeming it sufficient for purposes of this case to state that whenever the instruments L M′ of ordinary construction are used in substantially the manner above described they will give results of the nature indicated.

A feature of great utility in my improved receiving instrument resides in the fact which I have discovered that it is capable of operation and use even should one of the wires of the line be cut and the circuit interrupted. It results from this that the receiver may be primarily applied to and used for operating a system having but a single ungrounded line-wire, as illustrated in Fig. 2, in which a receiving instrument is shown at each end of the line, the latter being a single ungrounded conductor. In such a case as this the speech is transmitted, but not so audibly or distinctly as when a metallic circuit is used, but sufficiently well for ordinary purposes, and the reason for this appears to be that with an interrupted circuit such as illustrated the telephones M M′, connected directly with the line conductor, emit practically no articulate sounds, although those in the local or secondary circuits reproduce the speech very clearly and distinctly.

It will be understood that in practice the usual arrangement of call-bells and switches will not need to be disturbed in any material respect when applying my improvements to a circuit and that all of the instruments and appliances used in carrying out the invention may be of the ordinary and well-known kinds.

Having now described my invention and the manner in which the same is or may be carried out, what I claim is—

1. In a telephone system the combination with a line, of a local circuit, a plurality of independent induction-coils composed of long fine-wire and short coarse-wire coils, the first-named coils being connected with the line-circuit and the others being connected up in the local circuit, and a telephone-receiver in the local circuit, as set forth.

2. In a telephone system the combination with a line, of a local circuit, a plurality of independent induction-coils, comprised of primaries and secondaries having a different number of turns in the different coils, the long fine-wire primaries being connected with the line-circuit and the secondaries being included in the local circuit, and a telephone-receiver in the local circuit, as set forth.

3. In a telephone system the combination with a line, composed of a single ungrounded conductor, not forming a complete circuit, of a plurality of independent induction-coils, composed of long fine-wire and short coarse-wire coils, the fine-wire coils being connected up in the line, a closed or complete local circuit at the end of the line, including the coarse-wire coils of the induction-coils, and a telephone-receiver, connected with the local circuit, as set forth.

4. In a telephone system the combination with the line, of a local circuit, a plurality of independent induction-coils composed of long fine-wire and short coarse-wire coils, the first-named coils being connected with the line, and the others with the local circuit and two magneto-telephones one connected with the local circuit and the other with the line and constituting parts of a single receiving instrument, as set forth.

5. In a telephone system having a single ungrounded main line, means for modifying an electric current to correspond with sound-waves, means located at one end of the main line for transforming said current to corresponding waves of high potential on said ungrounded main line, means located at another portion of said main line for retransforming said speech-waves of the main line to corresponding low-potential currents, and a telephone-receiver in circuit with said last-mentioned means.

6. In a telephone system a single ungrounded main line, a telephone transmitter-circuit at one end and a receiver-circuit at the other end of the said main line, induction-coils connected to said main line for transforming pulsating currents caused to flow in the transmitter-circuits to corresponding currents of high potential in said main line and retransforming said currents to corresponding currents of low potential in the receiver-circuit.

CHARLES G. BURKE.

Witnesses:
M. LAWSON DYER,
R. STEPHEN DONOVAN.